United States Patent
Beesley et al.

(10) Patent No.: US 7,028,830 B2
(45) Date of Patent: Apr. 18, 2006

(54) APPARATUS FOR DIVERTING A STREAM OF ARTICLES

(75) Inventors: Robert C. Beesley, Greenville, SC (US); Gregory Bruns, Moore, SC (US); Brian Merritt, Easley, SC (US)

(73) Assignee: Hartness International, Inc., Greenville, SC (US)

( * ) Notice: Subject to any disclaimer, the term of this patent is extended or adjusted under 35 U.S.C. 154(b) by 0 days.

(21) Appl. No.: 10/853,778

(22) Filed: May 25, 2004

(65) Prior Publication Data
US 2005/0263374 A1 Dec. 1, 2005

(51) Int. Cl.
*B65G 47/51* (2006.01)
(52) U.S. Cl. ....................................... 198/594
(58) Field of Classification Search ................ 198/594, 198/444
See application file for complete search history.

(56) References Cited

U.S. PATENT DOCUMENTS

| | | |
|---|---|---|
| 3,318,439 A | 5/1967 | Sullivan |
| 3,682,295 A | 8/1972 | Roinestad |
| 4,018,325 A | 4/1977 | Rejsa |
| 4,063,632 A | 12/1977 | Neth et al. |
| 4,201,286 A | 5/1980 | Meier |
| 4,364,465 A | 12/1982 | Kraft et al. |
| 4,401,020 A | 8/1983 | Brux |
| 4,413,724 A | 11/1983 | Fellner |
| 4,469,219 A | 9/1984 | Cossé |
| 4,513,858 A | 4/1985 | Fellner et al. |
| 4,549,647 A | 10/1985 | Cossé |
| 4,718,656 A | 1/1988 | Reist |
| 4,863,010 A | 9/1989 | Proksa et al. |
| 4,944,315 A | 7/1990 | Focke |
| 4,989,718 A | 2/1991 | Steeber |
| 5,067,857 A | 11/1991 | Ward |
| 5,267,821 A | 12/1993 | Bodart et al. |
| 5,277,294 A | 1/1994 | Sherepa et al. |

(Continued)

FOREIGN PATENT DOCUMENTS

CA 2364216 A1 6/2003

(Continued)

OTHER PUBLICATIONS

International Search and Written Report for PCT/US2004/037233, Mar. 8, 2005.

(Continued)

*Primary Examiner*—Douglas Hess
(74) *Attorney, Agent, or Firm*—Dority & Manning, P.A.

(57) ABSTRACT

An apparatus for diverting a stream of articles includes a first conveyor driven in a first direction and at a first speed around a first axle, and a second conveyor is driven in a second direction generally opposite of the first direction and at a second speed around a second axle, the first and second conveyors disposed generally parallel to each other. A diverter element extends at least partially across the first and second conveyors to divert articles conveyed on the first conveyor onto the second conveyor. A differential drive mechanism is operatively interconnected with and driven by the first and second axles in a direction responsive to a relative rotation speed difference between the first and second axles, the differential drive mechanism being located exterior to the first and second conveyors. An endless loop is operatively connected to the diverter element and the differential drive mechanism, the endless loop being driven by the differential drive mechanism to thereby move the diverter element in a path generally parallel to the first and second conveyors. Related structures, drives, and controls are also disclosed.

59 Claims, 12 Drawing Sheets

U.S. PATENT DOCUMENTS

| | | |
|---|---|---|
| 5,282,525 A | 2/1994 | Covert |
| 5,335,780 A | 8/1994 | Watson |
| 5,350,050 A | 9/1994 | Franke |
| 5,413,213 A | 5/1995 | Golz et al. |
| 5,490,589 A | 2/1996 | Golz et al. |
| 5,690,463 A | 11/1997 | Yoshie |
| 5,722,655 A | 3/1998 | Reist |
| 5,772,005 A | 6/1998 | Hänsch |
| 6,026,947 A | 2/2000 | Persson |
| 6,152,291 A | 11/2000 | Steeber et al. |
| 6,168,005 B1 | 1/2001 | Petrovic |
| 6,182,812 B1 | 2/2001 | Hartness, III et al. |
| 6,230,874 B1 | 5/2001 | Steeber et al. |
| 6,260,688 B1 | 7/2001 | Steeber et al. |
| 6,334,528 B1 | 1/2002 | Bogle et al. |
| 6,382,398 B1 | 5/2002 | Steeber et al. |
| 6,497,321 B1 | 12/2002 | Horton et al. |
| 6,523,669 B1 | 2/2003 | Steeber et al. |
| 6,533,103 B1 | 3/2003 | Hartness et al. |
| 6,550,602 B1 | 4/2003 | Steeber et al. |
| 6,585,104 B1 | 7/2003 | Horton et al. |
| 6,591,963 B1 | 7/2003 | Wipf |
| 6,612,420 B1 | 9/2003 | Hartness, III et al. |
| 6,698,581 B1 | 3/2004 | Steeber et al. |
| 6,725,998 B1 | 4/2004 | Steeber et al. |
| 6,817,464 B1 | 11/2004 | Biondi et al. |
| 6,848,563 B1 | 2/2005 | Abert et al. |
| 2003/0209409 A1 | 11/2003 | Horton et al. |

FOREIGN PATENT DOCUMENTS

| | | |
|---|---|---|
| DE | 1 262 886 | 3/1968 |
| DE | 2618905 | 11/1977 |
| DE | 19856649 A1 | 6/2000 |
| FR | 2 583 394 A1 | 6/1985 |
| GB | 0831911 | 9/1957 |
| JP | S567805 | 1/1981 |
| JP | S5953315 | 3/1984 |
| JP | H5 262423 | 10/1993 |
| JP | H5 286552 | 11/1993 |

OTHER PUBLICATIONS

Int'l Search Report and Written Opinion for PCT/US2004/037233, Mar. 1, 2005.

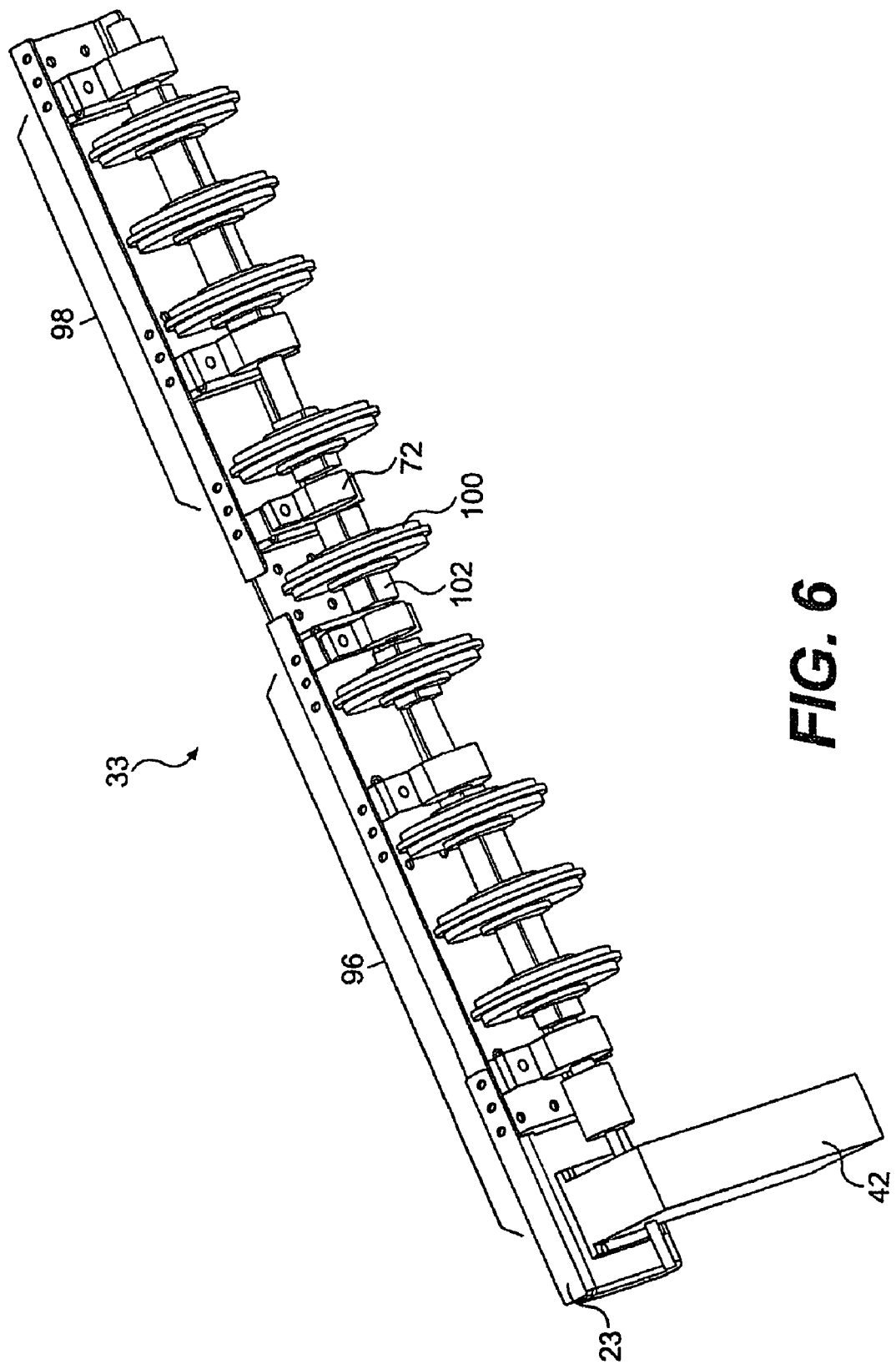

APPARATUS FOR DIVERTING A STREAM OF ARTICLES

BACKGROUND OF THE INVENTION

This invention relates generally to conveying systems having plural power-driven conveying sections and, more particularly, to apparatus for varying the effective length of the system by controlling the diversion of conveyed articles from one conveyor section to another.

Many conveyor applications require that articles transported on one conveyor belt be transferred to another conveyor belt that may be traveling in another direction, such as the opposite direction. Stationary rails spanning the conveying surfaces of the belts at a transfer point are often used for this purpose. In some applications, such as article accumulation, the transfer point can be moved. The moving transfer point allows the effective length of the conveying path and, consequently, the amount of articles accumulated to be controlled. In a spiral accumulator, such as that shown in U.S. Pat. No. 6,152,291, two parallel conveyor belts—an infeed belt and outfeed belt—are helically arranged with a rotatable transfer mechanism traveling between them. The position of the transfer mechanism depends on the relative speeds of the two oppositely-moving belts. A guide plate on the transfer mechanism directs articles from the infeed conveyor belt to the outfeed belt. A rotatable member in the transfer mechanism simultaneously engages drivers formed on the specially designed infeed and outfeed belts. The rotatable member, driven by the drivers, translates the transfer mechanism and its attached guide plate along the belts as determined by their relative speeds. The rotatable member rides along with the transfer mechanism.

A more common accumulation system is known as a bi-di (bi-directional) table. Typically, a bi-di table includes a bi-directional conveyor belt arranged to run perpendicular to a main conveyor belt. As articles build up on the main conveyor belt, backpressure directs them onto the bi-di belt, which runs in a direction away from the main conveyor. In this way, articles are accumulated on the bi-di belt's surface. As downstream processes require more articles, the direction of the bi-di belt is reversed so that the accumulated articles are pushed back onto the main conveyor belt. These bi-di tables, which support the bi-di belt and its drive mechanisms, are generally rectangular in shape with drive or idler shafts for sprockets or pulleys at each end. But, unlike the spiral accumulator, these simple, ubiquitous tables are not first-in, first out.

Thus, there is a particular need for a simple first in, first-out accumulation system, especially one that can be easily retrofitted in a bi-di table. More generally, there is also a need for a simple mechanism for diverting articles from one conveyor belt to another, such as oppositely-moving conveyor belts.

SUMMARY OF THE INVENTION

According to certain aspects of the invention, an apparatus for diverting a stream of articles includes a first conveyor driven in a first direction and at a first speed around a first axle, and a second conveyor driven in a second direction generally opposite of the first direction and at a second speed around a second axle. The first and second conveyors are disposed generally parallel to each other, and a diverter element extends at least partially across the first and second conveyors to divert articles conveyed on the first conveyor onto the second conveyor. A first transfer axle is located exterior to the first conveyor and rotated via the first axle, and a second transfer axle is located exterior to the second conveyor and rotated via the second axle. A differential drive mechanism is driven by the first and second transfer axles in a direction responsive to a relative rotation speed difference between the first and second transfer axles. A diverter element mover is operatively connected to the diverter element and the differential drive mechanism, the diverter element mover being driven by the differential drive mechanism to thereby move the diverter element in a path generally parallel to the first and second conveyors. Various alterations and additions are possible.

For example, the diverter element may be disposed above the conveyors. Also, the diverter element may include a separator for separating articles on the first conveyor from articles on the second conveyor.

A first drive mechanism may be provided for the first conveyor and a second drive mechanism may be provided for the second conveyor. A controller may be configured with the first and second drive mechanisms and the differential drive. The controller may control the speed of the first and second drive mechanisms as a function of a supply of articles to the first conveyor and a demand for articles from the second conveyor.

A framework may be provided, the conveyors and the diverter element supported in the framework. The framework may be disposable adjacent a main conveyor such that articles conveyed on the main conveyor are diverted onto the first conveyor, and articles on the second conveyor are diverted back onto the main conveyor. The framework may be disposable adjacent an infeed conveyor and an outfeed conveyor such that articles conveyed on the infeed conveyor are diverted onto the first conveyor, and articles on the second conveyor are diverted onto the outfeed conveyor.

The diverter element mover may include a cable driven via the differential drive mechanism. Also, a tensioning device may be provided for adjustably tensioning the cable. The tensioning device may be a spring-loaded pulley.

The first and second transfer axles may be disposed above the first and second conveyors, and/or the differential drive mechanism may be disposed above the first and second conveyors. The differential drive mechanism may include two input gears and a differential gear.

A transfer driver may operably connect the first axle and the first transfer axle, whereby the first transfer axle is driven via the transfer driver. Also, a transfer driver may operably connect the second axle and the second transfer axle, whereby the second transfer axle is driven via the transfer driver. Further, a transfer driver may operably connect the differential drive mechanism and the diverter element, wherein the diverter element is driven via the transfer driver, and the transfer driver may be an disposed around the differential drive mechanism and an idler roller disposed around the first axle. The diverter element mover may be disposed around and driven via the idler roller. Any or all of the transfer drivers may be endless loops such as belts or chains.

A sensing device may be provided for indicating a position of the diverter element. The sensing device may be an optical sensor, and if so, may sense a rotational position of a housing of the differential drive mechanism. A controller and a plurality of sensors may be provided in communication with the controller, the controller controlling whether the first and second conveyors are driven, and if so, at what speed the first and second conveyors are driven, all based on signals received from the sensors. The sensors may include two infeed sensors upstream from the first conveyor and three outfeed sensors downstream from the second conveyor. If so, one of the infeed sensors may generate a signal causing the controller to drive the first conveyor at a first speed, and a second of the infeed sensors generates a signal causing the controller to drive the first conveyor at a second speed. The second speed may be higher than the first speed. Also, one of the outfeed sensors may generate a first signal causing the controller to drive the second conveyor at a first lower speed or a second signal causing the controller to drive the second conveyor at a second higher speed. Two of the outfeed sensors may be spaced from each other, both generating signals causing the controller to stop the second conveyor.

According to other aspects of the invention, an apparatus for diverting a stream of articles includes a first conveyor driven in a first direction and at a first speed around a first axle, and a second conveyor driven in a second direction generally opposite of the first direction and at a second speed around a second axle. The first and second conveyors are disposed generally parallel to each other. A diverter element extends at least partially across the first and second conveyors to divert articles conveyed on the first conveyor onto the second conveyor. A differential drive mechanism is operatively interconnected with and driven by the first and second axles in a direction responsive to a relative rotation speed difference between the first and second axles, the differential drive mechanism being located exterior to the first and second conveyors. An endless loop is operatively connected to the diverter element and the differential drive mechanism, the endless loop being driven by the differential drive mechanism to thereby move the diverter element in a path generally parallel to the first and second conveyors. As above, various alterations and additions are possible.

According to other aspects of the inventions, an apparatus for diverting a stream of articles includes a first conveyor driven in a first direction and at a first speed, and a second conveyor driven in a second direction generally opposite of the first direction and at a second speed. The first and second conveyors are disposed generally parallel to each other. A diverter element extends at least partially across the first and second conveyors to divert articles conveyed on the first conveyor onto the second conveyor, the diverter element including a separator disposed between the first and second conveyors. A differential drive mechanism is driven in a direction responsive to a relative rotation speed difference between the first and second conveyors. A cable is attached to the diverter element so as to form an endless loop and driven by the differential drive mechanism, the cable being laterally adjacent only one of the first or second conveyors. The diverter element includes an arm having a first end attached to the cable and a second end attached to the separator, and further includes a control arm portion extending over the one of the first or second conveyors. The diverter element mover is driven by the differential drive mechanism to thereby move the diverter element in a path generally parallel to the first and second conveyors. As above, various alterations and additions are possible.

BRIEF DESCRIPTION OF THE DRAWINGS

These and other features, aspects, and advantages of the inventions are further addressed in the following description, appended claims, and accompanying drawings, in which:

FIG. 6 is an isometric view of a drive mechanism at the opposite end of FIG. 1 from the drive mechanism in FIG. 4;

DETAILED DESCRIPTION

Figure 1:
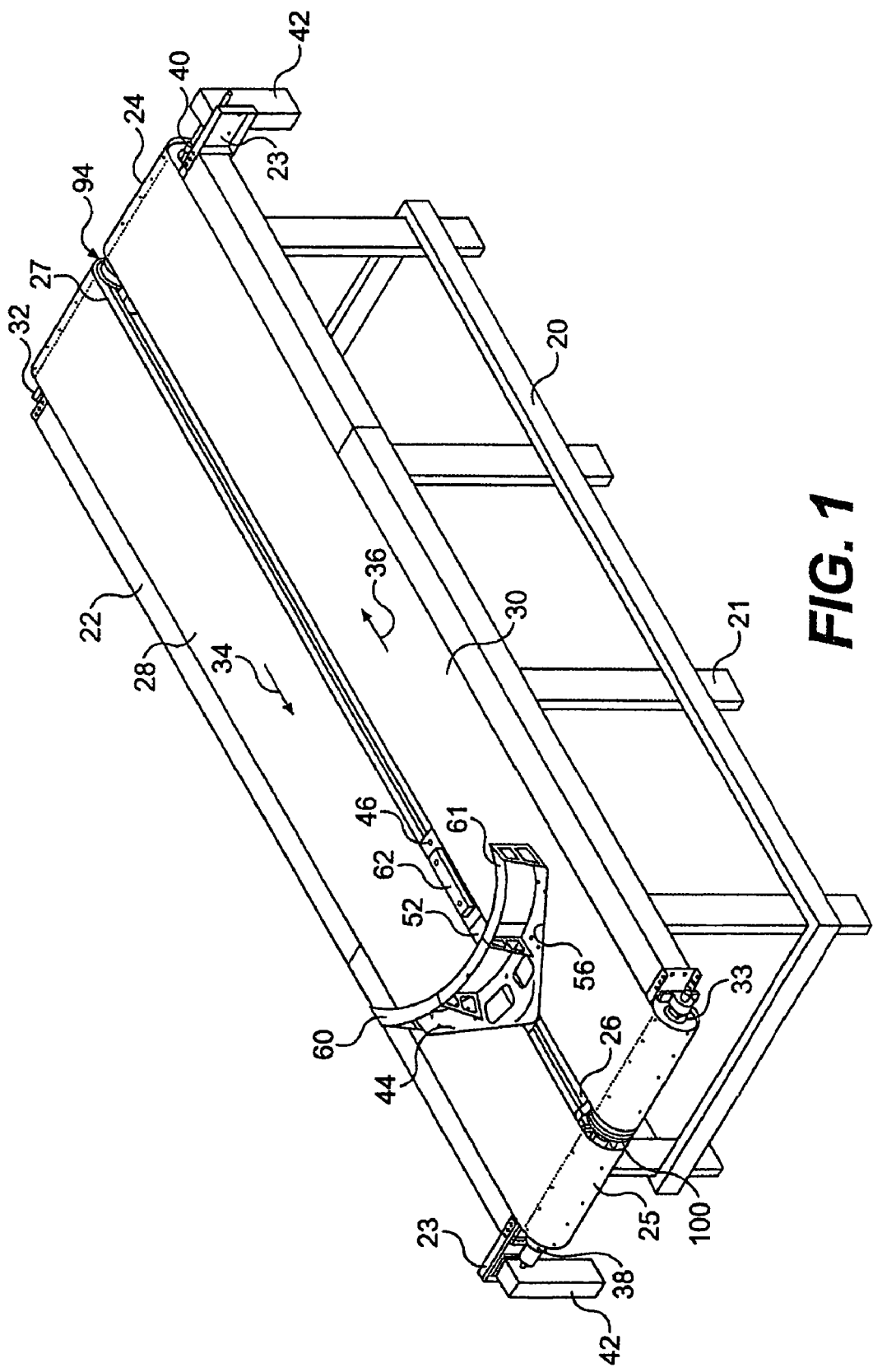
FIG. 1 is an isometric view, partly cut away, of an apparatus embodying features of the invention, the apparatus including a diverter element for diverting a stream of articles.
Figure 2:
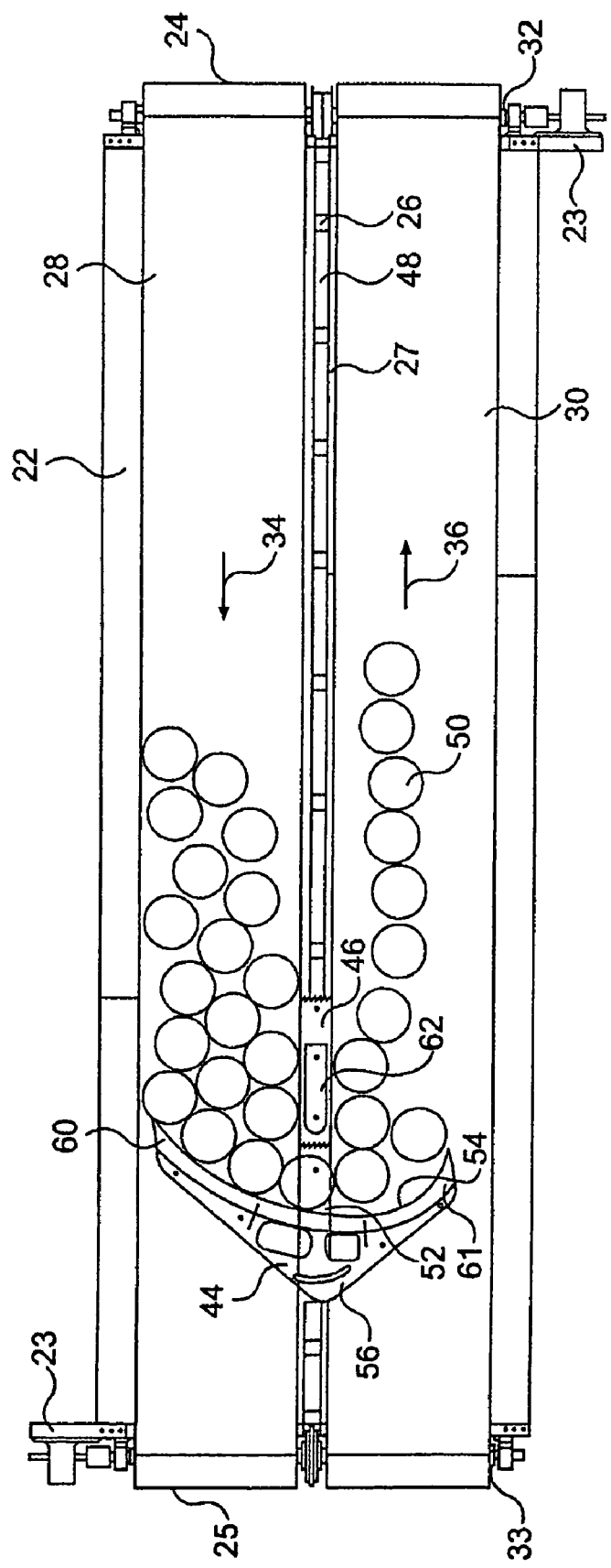
FIG. 2 is a top plan view of the apparatus of FIG. 1.

An apparatus embodying features of the invention for diverting articles from a stream of articles is shown in FIGS. 1 and 2. The apparatus includes a conveyor bed formed by a framework 20 with legs 21 and a pair of parallel upper support rails 22. Crossbeams 23 span the support rails at opposite ends 24, 25 of the conveyor bed. Cross supports 26 forming part of the framework support a conveyor pan or wearstrips 27 that underlie the carryway of a first infeed conveyor 28 and a parallel second outfeed conveyor 30.

Each conveyor includes an endless belt, or chain, wrapped around rotating assemblies 32, 33 at the first and second ends 24, 25 of the conveyor bed. The belt, or chain, is preferably an endless modular plastic conveyor belt, such as any of those standard belts manufactured and sold by Intralox, Inc. of Harahan, La., USA. Modular conveyor belts are preferable because the modules can be easily linked together end to end and side by side with hinge pins typically in a bricklay pattern to construct belts of almost any length and width. But any belt, including, for example, metal chains or fabric belts, could be used effectively. The infeed belt 28 and the outfeed belt 30 are driven in the direction of arrows 34, 36.

In the example of FIGS. 1 and 2, the infeed belt 28 is driven by a first infeed drive mechanism 38, which is part of the second rotating assemblies 33. The outfeed belt 30 is driven by a second outfeed drive mechanism 40, which is part of the first rotating assemblies 32. In this drive arrangement, the first and second drive mechanisms pull the belts in tension along the conveyor carryway in the direction of the arrows 34, 36. Motors 42, preferably variable-speed motors, in the infeed and outfeed drive mechanisms rotate the rotating assemblies, which engage the belts positively or frictionally, to drive the belts in the directions shown.

The apparatus also includes a diverter element 44 that extends across at least a portion of the width of the first and second conveyors. The diverter element is attached to a carrier, in this example, an intermediate belt 46 disposed in the space 48 between the infeed and outfeed belts. The intermediate belt is preferably a modular plastic conveyor belt, but could as well be a metal chain or a fabric belt. Only a portion of the intermediate belt is shown in FIGS. 1 and 2 in order to show other features of the apparatus, but the intermediate belt is co-extensive with the infeed and outfeed belts in that it is also an endless belt wrapped around the first and second rotating assemblies 32, 33. The intermediate belt, positioned between the infeed and outfeed belts, abuts each of them with only a minimal gap. (Siderails to confine articles on the conveyor are not shown to simplify illustration.)

Figure 3:
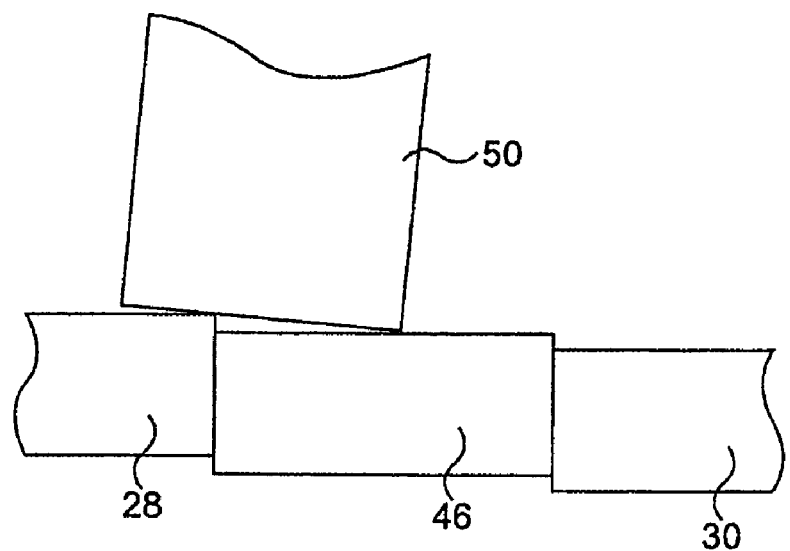
FIG. 3 is an end elevation schematic of a stepped arrangement of conveying surfaces usable in the apparatus of FIG. 1.

The diverter element 44 captures articles 50 from a stream of articles on the infeed belt 28 and directs them across a transfer surface 52 of the intermediate belt onto the outfeed belt 30 traveling in the opposite direction. The diverter element has a guide surface 54, in this example, an arcuate surface, upstanding from a base 56. The base is attached to a section of the intermediate belt so that the diverter element moves with the intermediate belt. Arms 60, 61 of the diverter element extend across at least a portion of the conveying surfaces of the infeed and outfeed belts. In the version shown in FIGS. 1 and 2, the first arm 60 extends across most of the width of the infeed belt. In this case, all of the articles 50 in the stream are received by the diverter element. But it is also possible to have a shorter first arm that would capture some articles, but allow others to pass. The arms can ride directly on the infeed and outfeed conveyors, or they can be positioned above the conveying surfaces as long as they are not so high as to allow articles to be diverted to pass underneath in normal operation. A barrier 62 is also attached to the intermediate belt. The guide surface of the diverter element and the barrier bound the transfer surface 52 of the intermediate belt. The barrier ensures that products are diverted only across the transfer surface and not at other points along the carryway. For smooth transfer of product, the conveying surfaces of the infeed and outfeed belts are preferably coplanar with the outer surface of the intermediate belt. It would also be possible, as shown in FIG. 3, to have the conveying surfaces of the infeed 28 and outfeed 30 conveyor belts and the outer surface of the intermediate belt 46 stepped down in elevation from the infeed belt to the outfeed belt. Alternatively, the entire conveyor bed could be slanted downward, off horizontal, toward the outfeed belt to get an assist from gravity in clearing articles off the transfer surface.

Figure 4:
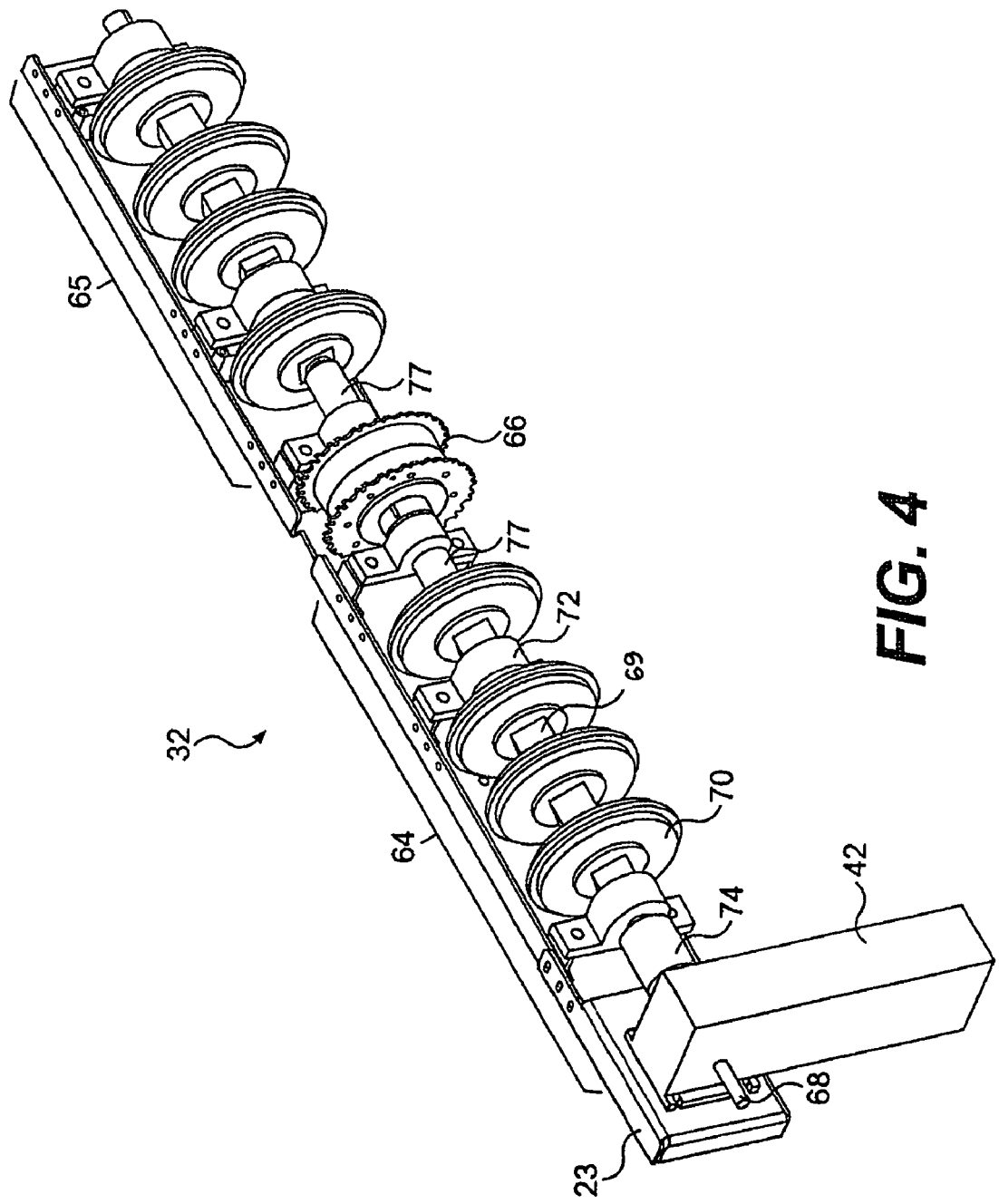
FIG. 4 is an isometric view of a drive mechanism, including a differential drive, at one end of the apparatus of FIG. 1.

In the exemplary version of the apparatus shown in FIGS. 1 and 2, the rotating assemblies 32 at the first end 24 of the conveyor bed are shown in more detail in FIG. 4. A first rotating assembly 64 and a second rotating assembly 65 are coaxially arranged and terminate in a differential drive mechanism 66. The first rotating assembly actively drives the outfeed belt 30. The assembly is stationarily mounted to the crossbeam 23. The assembly includes the drive motor 42, which, in this example, has a right-angle drive shaft 68. The first rotating assembly includes a shaft 69, which is shown segmented, on which sprockets 70 are mounted. Bearing blocks 72 support the shafts for rotation. The numbers of bearing blocks, sprockets, and shaft segments required depend on the width of the belt and its load. In this example, four sprockets, three bearing blocks, and two shaft segments are shown for the first rotating assembly. The sprocket shaft 69 is connected to the motor drive shaft 68 by a coupling 74. The other end of the sprocket shaft is connected to a differential shaft 76 (FIG. 5) by a coupling 77. The sprockets have peripheral teeth (shown in FIG. 4 as a raised portion to simplify the drawing) that engage underside receiving structure in the outfeed belt, or chain, to drive and track it. In the case of a fabric belt, the toothed sprockets are replaced by roller pulleys that frictionally drive the belt.

While the first rotating assembly 64 at the first end of the belt forms a drive mechanism for the outfeed belt, the second rotating assembly 65 is an idler assembly for the infeed belt 28. In this version of the apparatus, the drive mechanism for the infeed conveyor is in the rotating assemblies 33 stationed at the other end 25 of the conveyor bed. Although this arrangement is preferable because both drive mechanisms are pulling the belts, the drives could be stationed at the same end or, especially for long belts, distributed along the length of the belts. The idler assembly 65 is similar to the first rotating assembly 64, but is not directly coupled to a motor. It is, however, coupled to the differential drive mechanism by a coupling 77. Thus, the differential drive mechanism is coupled to each rotating assembly, which rotates at a speed corresponding to the speed of the associated belt. Each rotating assembly, whether including a drive shaft or an idler shaft, acts as an input drive mechanism to the differential drive mechanism.

Figure 5:
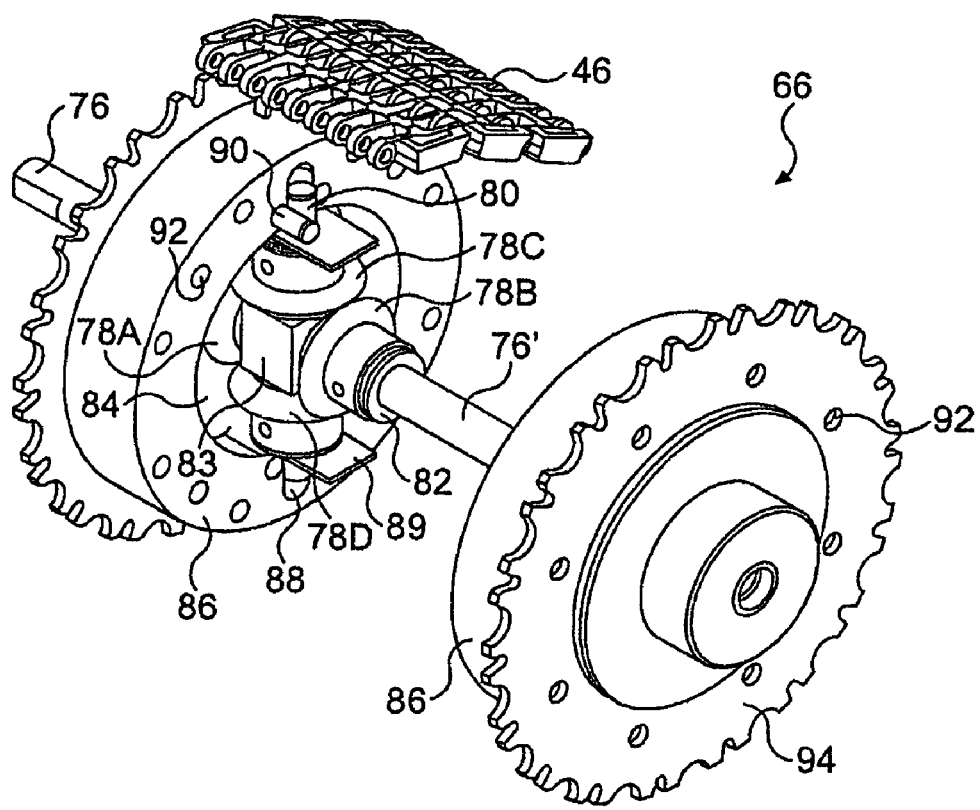
FIG. 5 is an isometric view of the opened-up differential drive mechanism of FIG. 4.

The differential drive mechanism is shown in more detail in FIG. 5. The mechanism includes four bevel gears 78A–D. The differential shaft 76, rotating at the speed of the outfeed belt, is connected to the bevel gear 78A. The differential shaft 76', rotating at the speed of the infeed belt, is connected to the opposite bevel gear 78B. The gears mesh with gears 78C and 78D, which are coaxially and rotatably aligned as pinion gears on pinion shaft 80. Couplings 82 retain the bevel gears in place on the shafts and pinion shaft. The ends of the pinion shaft extend from a spider 83, which also provides supports for the differential shafts 76, 76'. The differential mechanism fits in a hollow 84 formed in the center of two mating central housing halves 86. The ends of the pinion shaft fit in cavities 88 formed radially in the housing halves. Metal plates 89 serve as thrust bearings. Dowels 90 register the two housing halves, which are held together conventionally by bolts or screws through holes 92. A toothed sprocket wheel 94 is attached to each housing half. The peripheral teeth of the sprocket wheel engage the intermediate belt 46 to drive it.

The geared differential works conventionally in that relative motion of the shaft output bevel gears 78A and 78B causes the pinion gears 78C and 78D to rotate about the axis of the differential shafts 76, 76'. As the pinion gears rotate, the ends of the pinion shaft 80 cause the housing and the sprocket wheels to rotate. The speed of rotation depends on the relative speeds of the rotation of the output shaft bevel gears. In the situation where the outfeed belt and the infeed belt are moving at the same speed in opposite directions, the outfeed output bevel gear 76 rotates in one direction at a certain speed and the infeed output bevel gear 76' rotates in the opposite direction at the same speed, which causes the pinion gear assembly to rest with its pinion shaft stationary. As one of the conveyor belts speeds up relative to the other, the differential drive mechanism causes the housing and sprocket wheel assembly to rotate in the direction of the faster moving rotating assembly, but at half the difference between the speeds of each rotating assembly. Thus, in this example, the speed s of the intermediate belt is given by $s=\frac{1}{2}(s_1-s_2)$, where $s_1$ is the speed of the faster-moving belt and $s_2$ is the speed of the slower-moving belt. Of course, the gearing ratios can be altered by the use of gear reducers or other conventional techniques to derive other speed relationships that may be generically defined by s is proportional to $as_1-bs_2$, where a and b are parameters set by the effective gear ratios, for example. This would allow the intermediate belt to be driven at a speed that is influenced relatively more by one of the conveyor belts than the other in special applications.

The second rotating assemblies 33 stationed at the second end 25 of the conveyor bed are similar to those at the first with the following difference shown in FIG. 6. First, the drive motor 42 for the infeed belt and its drive elements 96 are mounted on the crossbeam 23 at this end. Second, idler elements 98 form the rotating assembly for the infeed belt. Third, the rotating elements, although mounted coaxially, do not drive a differential mechanism at this end. Instead, an idler sprocket 100 on an idler shaft 102 supported by flanking bearing blocks 72 is provided to support and track the endless intermediate belt 46 at this end of the conveyor bed.

Figure 7:
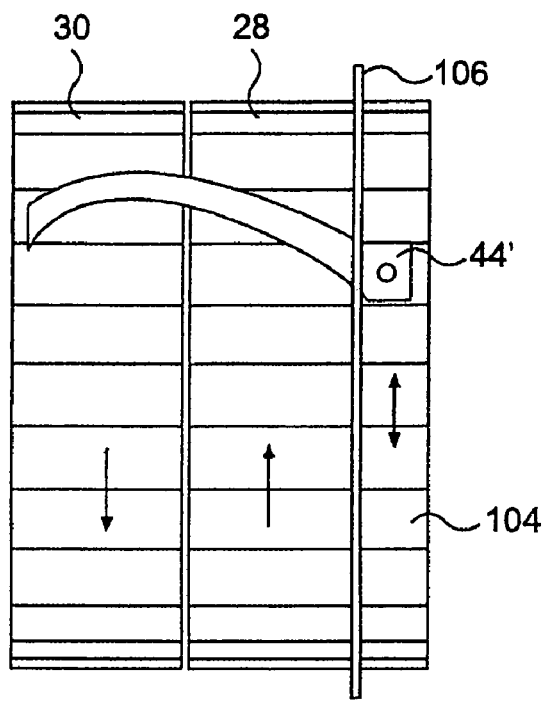
FIG. 7 is a top plan view of another version of apparatus for diverting articles, in which the diverter element is driven from one side.

Another version of an apparatus for diverting articles is shown in FIG. 7. In this version, the infeed belt 28 and the outfeed belt 30 abut each other. The diverter element 44' is carried by a carrier belt 104 next to, in this example, the infeed belt. The diverter element extends through a gap between stationary side rails 106 across the conveying surfaces of the infeed and outfeed conveyor belts to direct articles from the first belt directly to the oppositely running second belt without having to traverse an intermediate belt—a distinct advantage. The carrier belt is driven differentially by the drive mechanisms of each of the conveyor belts. Because, in this version, the carrier belt is not adjacent to the outfeed belt, the drive mechanism of the outfeed belt would have to be connected with the differential drive mechanism of the carrier belt through an intervening jackshaft or some other conventional linkage.

Figure 8:
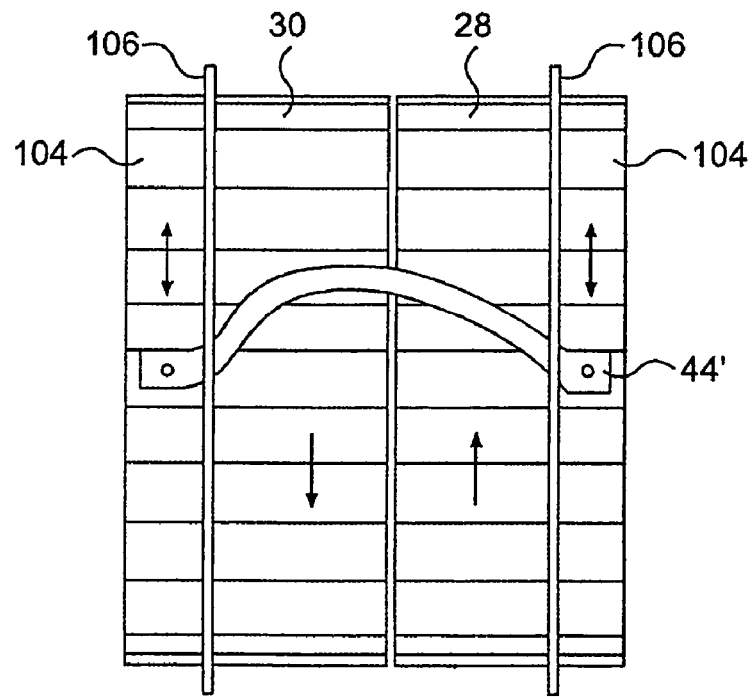
FIG. 8 is a top plan view of another variation of diverter apparatus as in FIG. 7 with the diverter attached at flanking positions.

A slightly modified alternative to the apparatus in FIG. 7 is illustrated in FIG. 8. In this version, a diverter element 44" is carried at each end by a carrier belt 104. This version provides better support for the diverter element. The two flanking carrier belts are each driven differentially in unison.

The versions described thus far are especially adaptable to be retrofitted into existing bi-di tables, which typically provide for sprockets, shafts, and motors at each end and include belt-supporting structure along the carryway and returnway. Essentially, the bi-di belt and its drive and idler sprocket assemblies are replaced by the belts and rotating assemblies of the invention. The remainder of the bi-di conveyor bed remains largely unchanged. As already mentioned, the versions described lend themselves to easy expansion through widening or lengthening of the belts.

Figure 9:
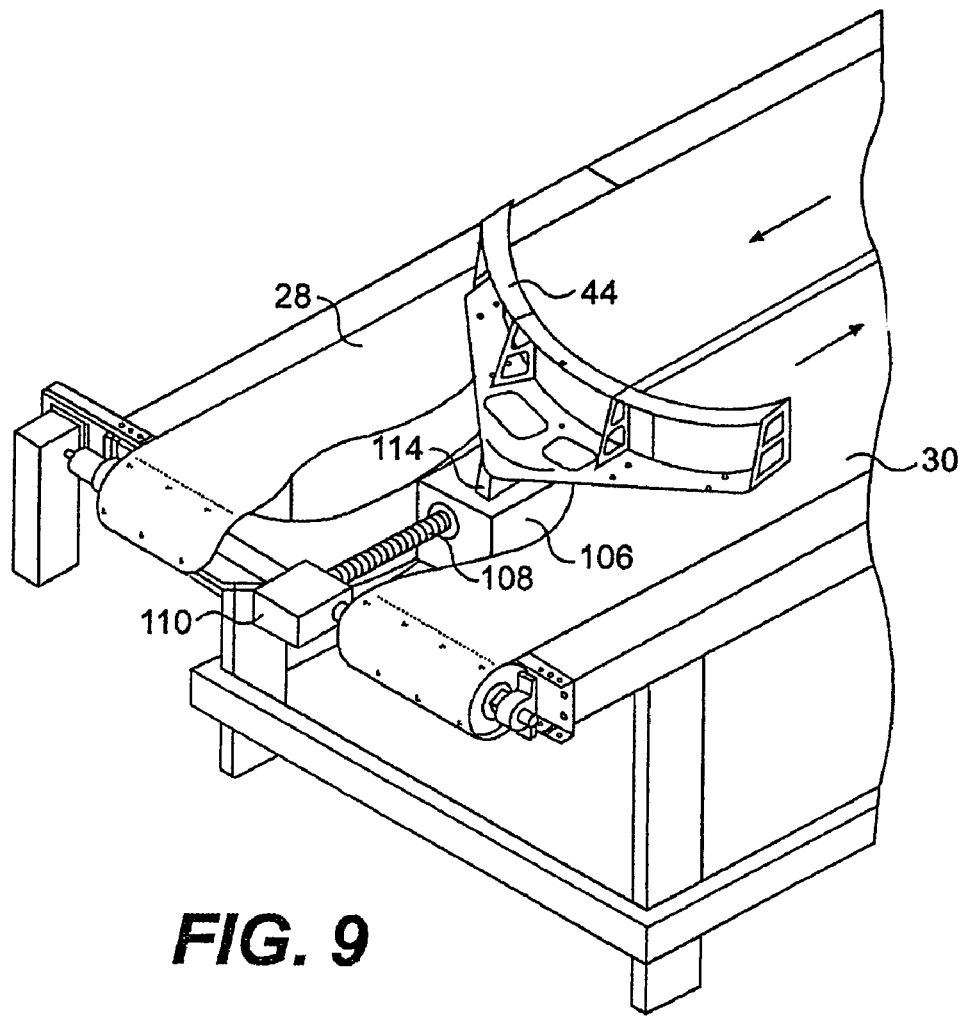
FIG. 9 is an isometric view of a portion of another version of article-diverting apparatus partly cut away to show a differential drive for a lead screw.
Figure 10:
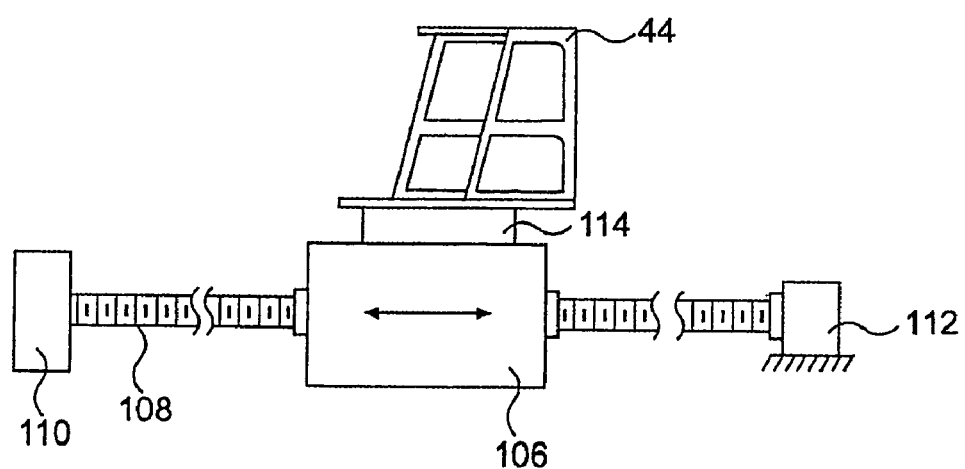
FIG. 10 is a side view of the lead screw drive of FIG. 9.

To this point, the carrier for the diverter element has been described as a belt (an intermediate belt or a carrier belt) differentially driven by a differential drive mechanism connected to infeed and outfeed belt drive mechanisms. In another version of the apparatus, shown in FIGS. 9 and 10, the diverter element 44 is carried on a carrier 106, which is the linearly variable nut of a lead screw 108. The lead screw is connected at one end to a stationary differential gear 110 and at the other to a fixed bearing block 112 at the opposite end of the carrier run. The speed and direction of rotation of the lead screw depend on the relative speeds of the infeed 28 and outfeed 30 belts. As the lead screw rotates, the carrier is driven linearly along its run. To minimize the space between the two conveyor belts, the diverter element is connected to the carrier by a thin, but sturdy, fin 114 that is attached to each by welding, for instance.

Figure 11:
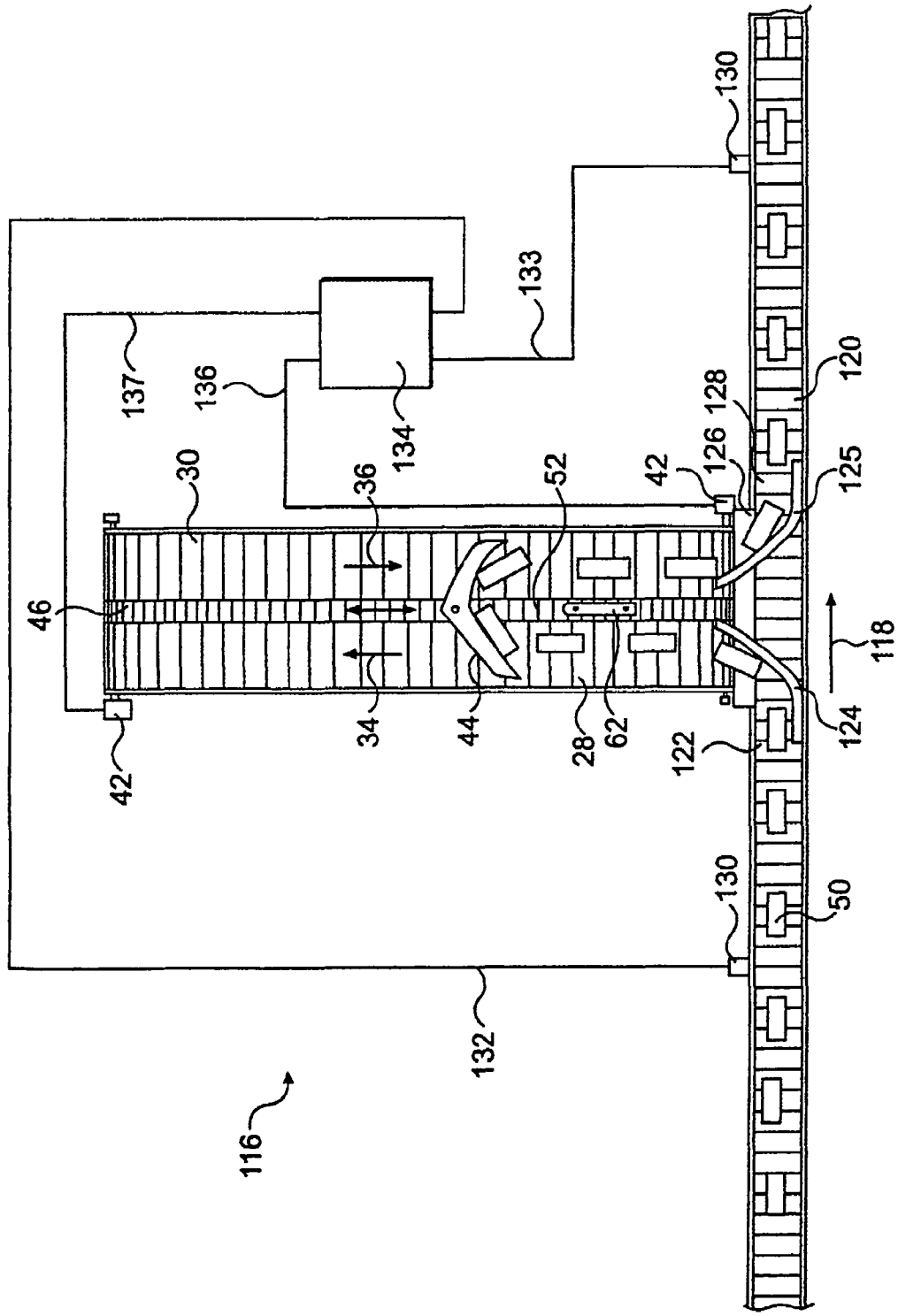
FIG. 11 is a top plan schematic of a first-in, first-out accumulator application using the apparatus of FIG. 1.

All of these diverter carrier arrangements can be used to divert articles from one conveyor to another and are useful, for example, in a first-in, first-out article accumulator, such as the one shown in FIG. 11. The accumulator system 116 effectively adjusts the length of a conveying path depending on the upstream supply of and the downstream demand for articles. A stream of articles 50 conveyed in the direction of arrow 118 by a main conveyor line 120 is received at an upstream location 122 of the main conveyor by an infeed conveyor belt 28 driven in the direction of arrow 34. An infeed guide rail 124 guides the stream of articles onto the infeed belt. As the infeed belt transports the articles, they are captured and redirected by the diverter element 44 attached to and carried by the intermediate belt 46. The articles transfer across the transfer surface 52 of the intermediate belt between the diverter element and the barrier 62 and onto the outfeed conveyor belt 30. The diverted articles are delivered to the main conveyor at a downstream location 128 by the outfeed conveyor belt driven toward the main conveyor. An outfeed guide rail 125 guides the stream of articles back onto the main conveyor. A transfer plate 126, such as a deadplate, is used for a smooth transfer of articles to and from the main conveyor. The main conveyor could alternatively use other transfer techniques, such as transfer belt edges attached to and moving with the main conveyor belt. The infeed and outfeed belts need not be perpendicular to the conveyor, but could, for example, run parallel to a main conveyor line that includes upstream and downstream segments on opposite sides of the infeed/outfeed belt unit. The accumulator allows the transport of articles along the main conveyor line to be adjusted for mismatches between the upstream supply of and the downstream demand for articles. The accumulator does this by controlling the effective length of the conveying path. As the supply of articles increases, the infeed belt is driven at a higher speed than the outfeed belt. The differentially driven carrier belt moves away from the main conveyor. With the diverter element farther away from the main conveyor, more articles can accumulate on the lengthened conveying path. As the demand for articles downstream increases to a level outstripping the supply of articles, the outfeed conveyor is driven faster than the infeed conveyor. When this occurs, the carrier belt and its diverter element move toward the main conveyor and shorten the effective conveying path and the proportional accumulation area. For protection, limit switches (not shown) at each end of the infeed/outfeed conveyor bed cause the motors to stop when the diverter element gets to either end of its permissible range along the conveyor bed.

The supply of and demand for articles can be sensed by conventional article sensors 130 positioned at, for example, upstream and downstream locations on the main conveyor. Their signals 132, 133 are electrically directed to a controller 134, which further sends control signals 136, 137 to the variable-speed drive motors 42 to adjust the speeds of the infeed and outfeed belts. Although the differential drive mechanisms described to this point are mechanically-coupled differentials, it would alternatively be possible to have an independent drive for the carrier with the differential speed calculated by the controller and an appropriate speed control signal sent to the carrier's differential drive mechanism. With such an arrangement, the controller easily tailors the speed relationship (e.g., $s=as_1-bs_2$) to the needs of the system at any time. An operator adjusts the values of the a and b parameters through the controller.

FIGS. 12–15 show another embodiment of an accumulator system 216 according to certain other aspects of the invention. As above, like or similar reference numerals are used with the embodiment of FIGS. 12–15 to identify like or similar elements found in the previous embodiments.

Figure 12:
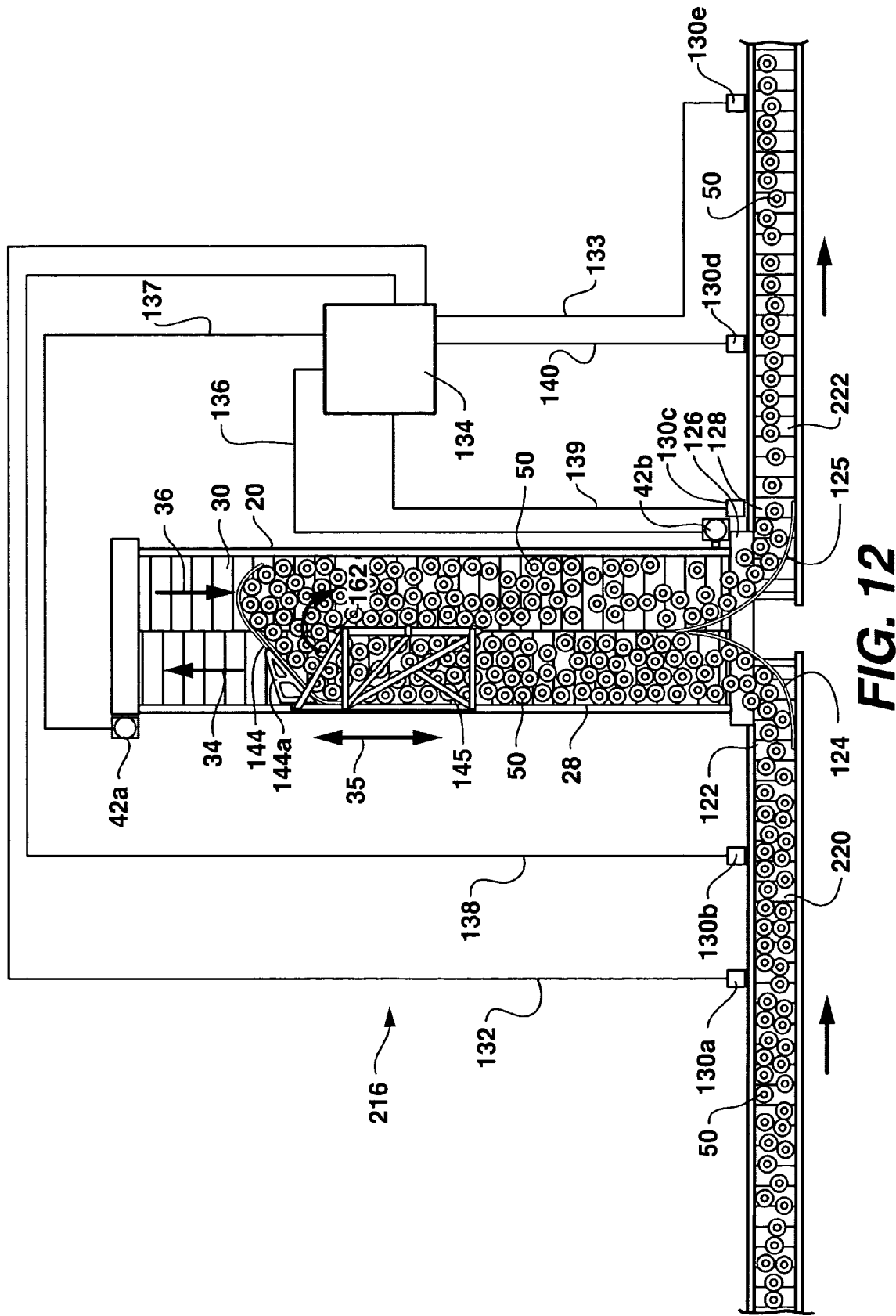
FIG. 12 is a top plan schematic of an alternate embodiment of an accumulator.

Broadly, as shown in FIG. 12, a first conveyor 28 and second conveyor 30 are mounted within a framework 20 adjacent an infeed conveyor 220 and an outfeed conveyor 222. Guide rails 124 and 125 divert objects onto and off conveyors 28 and 30 relative to conveyors 220 and 222. A diverter element 144 extends at least partially across conveyors 28 and 30 to divert articles from conveyor 28 to conveyor 30. A diverter element mover (not shown in FIG. 12) moves diverter element 144 in a path generally parallel to the first and second conveyors 28 and 30 (see arrows 34–36). Diverter element 144 may include a separator 162 for separating articles on conveyor 28 from articles on conveyor 30, that is preventing interference between articles on the two conveyors. Diverter element 144 may be attached to an arm 145 extending over one of conveyors 28 or 30 to a distal end where separator 162 is attached. As shown in FIG. 12, arm 145 extends across conveyor 28. However, arm 145 and diverter 144 could instead be mounted on the opposite side of framework 20 so as to extend from adjacent the right (as shown) side of conveyor 30.

A bottom portion of diverter 144 and separator 162 may include friction reducing materials compatible with conveyors 28 and 30. Also, a lubricant, such as soapy water, may be applied to conveyors 28 and 30 to improve movement of articles 50 and sliding of diverter 144 and separator 162.

It should be understood that, although FIG. 12 shows conveyors 220 and 222 as substantially perpendicular to conveyors 28 and 30, conveyors 220 and 222 could instead be arranged so as to approach conveyors 28 and 30 at other orientations, including substantially parallel, if desired. If so, other designs for guide rails 124 and 125, such as including guide rails on both sides of the conveyors, may be required. Also, a single main conveyor, such as conveyor 120 shown in previous embodiments, could be used with system 216 if desired. All such options are within the scope of the present invention.

System 216 of FIG. 12 may also include up to five sensors 130a–130e mounted adjacent conveyors 220 and 222, rather than only the two sensors 130 used with previous embodiments. Use of these additional sensors is an option that can provide improved performance and flexibility in certain applications.

For example, in one arrangement, sensor 130a may comprise an infeed high speed proximity switch, sensor 130b may comprise an infeed present proximity switch, sensor 130c may comprise an outfeed stop proximity switch, sensor 130d may comprise an outfeed full backup proximity switch, and sensor 130e may comprise an outfeed high speed proximity switch. Each of the sensors may comprise an optical sensor, an acoustic sensor, a mechanical sensor, etc. If the five identified sensors are used, they may be operated as follows, although fewer than all five are of course possible.

Infeed product present proximity switch 130b senses presence of conveyed articles as they approach conveyor 28. If sensor 130b detects articles present, a signal 138 will be sent to controller 134 which will then send a signal 137 to motor 42a to drive conveyor 28 at a speed necessary to accumulate articles on conveyor 28. Sensor 130a is located further upstream than is sensor 130b. If sensor 130a detects accumulating articles, signal 132 is sent to controller 134 which then sends a signal 137 to motor 42a to run conveyor 28 at a higher speed. Thus, if conveyed articles are backing up further along conveyor 220 so as to reach sensor 130a, conveyor 28 will be run at a faster speed to move articles more quickly onto conveyor 28.

With regard to outfeed conveyor 222, sensor 130c may sense the presence of a backup of conveyed articles on conveyor 222. If so, sensor 130c sends a signal 139 to controller 134 which, in turn, sends a signal 136 to motor 42b to stop conveyor 30. Sensor 130d also senses presence a backup of articles on conveyor 222, a bit further downstream, thus providing a backup to sensor 130c. If sensor 130d detects a backup of articles, it sends a signal 140 to controller 134 which sends a signal 136 to motor 42b to stop conveyor 30. Finally, sensor 130e is even further downstream along conveyor 222. If this sensor detects presence of articles, a signal 133 is sent to controller 134 which sends a signal 136 to motor 42b so that conveyor 30 runs at a regular speed. If sensor 130e senses no articles, controller 134 directs conveyor 30 to run at a high speed.

Thus, use of one or more of sensors 130a–130e, in conjunction with controller 134, provides an operation whereby flow of articles along conveyor 222 may be further optimized into a desired pattern. In particular, a steady, uniform flow may be achieved. Various other methods of using sensors 130a–130e may be employed. For example, speeds of conveyors 28 and 30 could be incremented or decremented slightly if desired, in response to sensed backups or lack thereof. Generally, use of the sensors and controller in this manner is dependent upon the application, rate of flow, upstream and downstream stations, and type of articles being conveyed. Upon installation, one skilled in the art can likely devise various suitable modes of operation using the disclosed structures.

Additional sensors (not shown in FIG. 12) may be utilized within framework 20 to sense the position of diverter element 144, so as to identify when the conveyors 28 and 30 are empty or overloaded, or to determine whether diverter element 144 has over-traveled in either direction. Also, as it will be discussed below, additional sensors may be utilized to identify an overload or the position of elements used to position diverter element 144.

Figure 13:
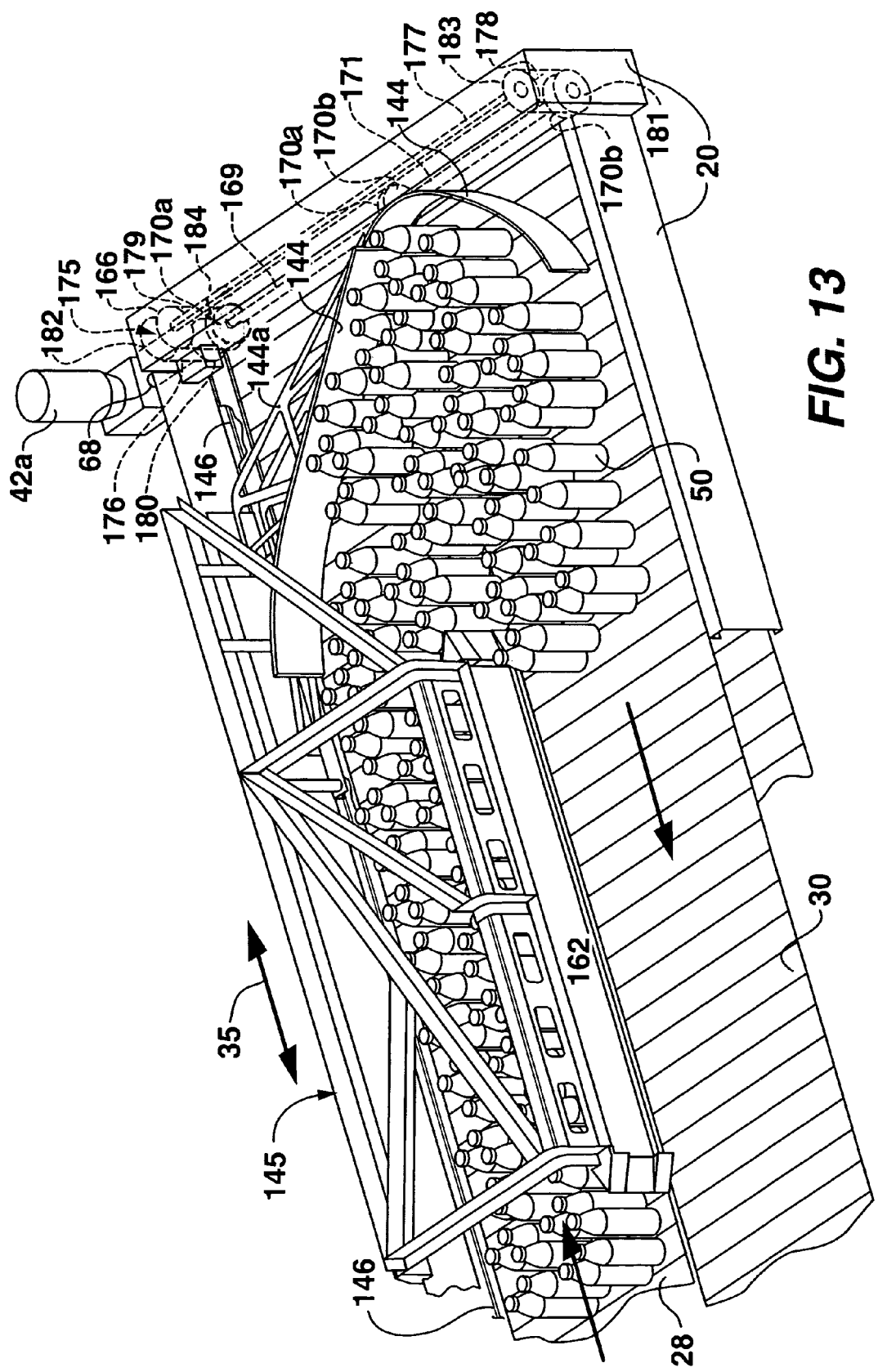
FIG. 13 is a partial isometric view of the accumulator of FIG. 12.

FIG. 13 shows further details of diverter element 144, including its supporting frame 144a and arm 145 for positioning separator 162. As shown, arm 145 includes numerous elements extending over conveyed articles 50. Diverter element 144 is driven along framework 20 by a diverter element mover 146. As shown, diverter element mover 146 is disposed within framework 20. Diverter element mover 146 may comprise an endless loop, such as a cable, belt, chain, or the like. Diverter element mover 146 is driven by a differential drive mechanism 166 to thereby mover diverter element 144 in path 35 generally parallel to the first and second conveyors 28 and 30.

As shown, motors 42a, 42b drive conveyors 28 and 30. Motors 42a and 42b are disposed at opposite ends so as to pull conveyed objects toward them, rather than to push the conveyed objects away. However, if desired, both motors could be located at the same end. Motor 42a and 42b drive conveyors 28 and 30 via driven gears 170a on one end, and idler gears 170b are disposed at the opposite ends of conveyors 28 and 30.

Axles 169 are collinear with respect to axles 171, although axles 169 and 171 rotate independently from each other. Driveshafts 168 extending from motors 42a and 42b drive gears 170. Transfer axles 175 and 177 are driven via axles 169 and 171 respectively. Transfer axles 175 and 177 in turn drive differential drive mechanism 166 in a direction responsive to a relative rotation speed difference between first and second transfer axles 175 and 177, or ultimately, the speed difference of conveyors 28 and 30.

As shown, first and second transfer axles 175 and 177 may be located above conveyors 28 and 30. Doing so prevents any objects, debris, lubricants, etc. from leaking onto the transfer axles or differential drive mechanism 166. However, the transfer axles and differential drive mechanism may alternatively be located beside or beneath conveyors 28 and 30, if desired. Internally, differential drive mechanism 166 may be similar to mechanism 66 described above, having two input gears, a differential gear, etc.

First and second transfer drivers 176 and 178 may be provided to operably connect first axle 169 and first transfer axle 175, and second axle 171 and second transfer axle 177, respectively. As shown, first and second transfer drivers 176 and 178 may comprise an endless loop, such as a belt, chain, cable, or the like. Transfer drivers 176 and 178 are driven via pulleys 180–183 disposed on the various axles, as shown best in FIG. 15. As shown, driveshaft 68 is formed unitary with axle 169, so as to form a single rotating member. Bearing blocks 172 may be provided for certain of the axles. Additional blocks (not shown) may also be provided as needed.

Transfer drivers 176 and 178 essentially provide input to differential drive mechanism 166 so as to provide information regarding the speed of conveyors 28 and 30. As above, if conveyors 28 and 30 are moving at identical speeds, then the input to differential drive mechanism 166 via transfer axles 175 and 177 should be equal, causing no rotation of the outer housing of differential drive mechanism 166. The diameter of pulleys 180–183 should be designed in conjunction with gears 170a and 170b, and idlers 172 so that accurate input is provided to differential drive mechanism 166. However, if different axle 175 and 177 speeds are desired for some reason, gearing inside of differential drive mechanism 166 could be modified accordingly.

Figure 15:
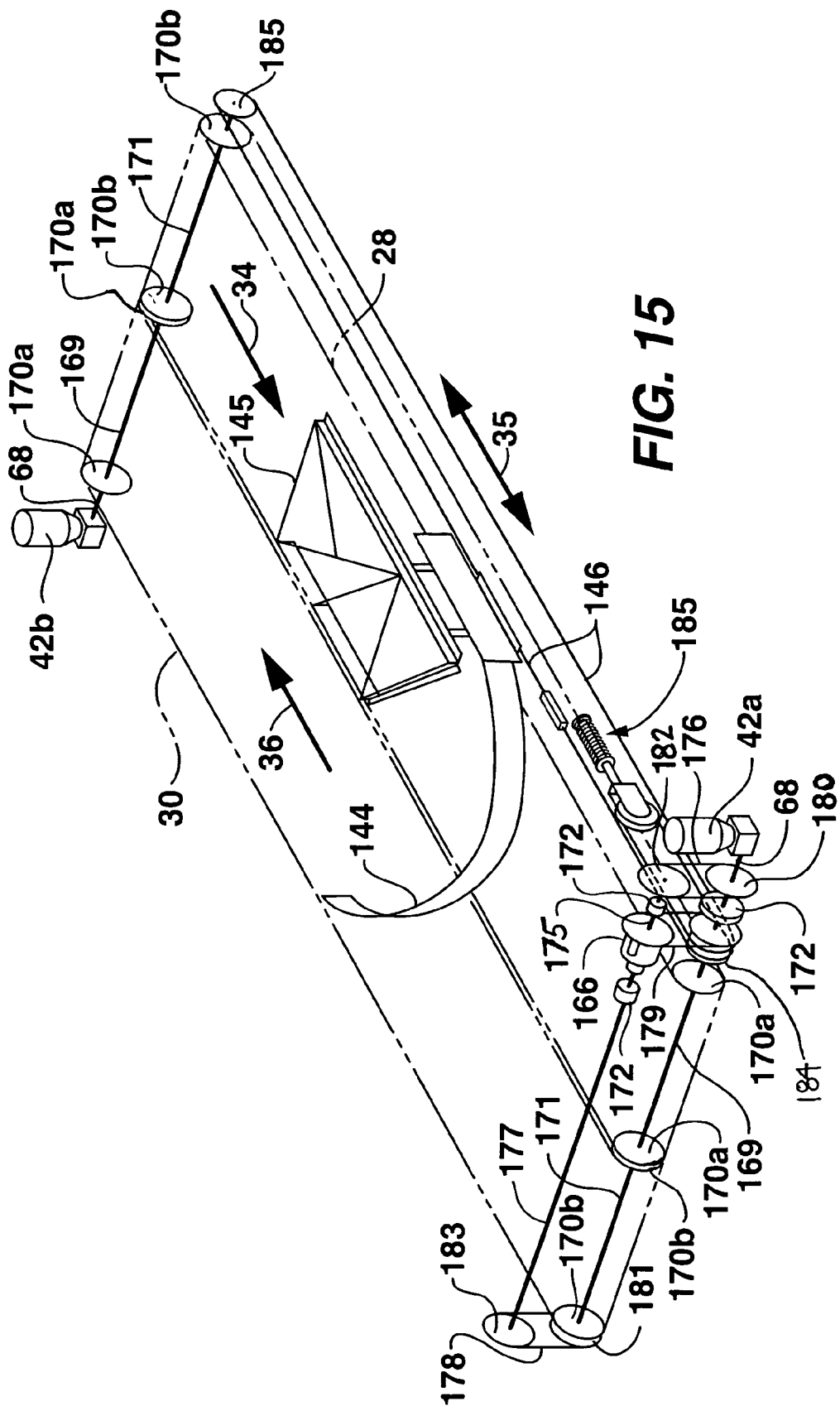
FIG. 15 is an isometric schematic of the accumulator of FIG. 12.

A third transfer driver 179 is disposed around differential drive mechanism 166 and an idler roller 184 mounted on driveshaft 68/axle 169. Third transfer driver 179 is driven by differential drive mechanism 166 and provides an output to thereby move diverter element 144 along conveyors 28 and 30. As shown, diverter element mover 146 comprises an endless loop, such as a cable attached to diverter element 144. Diverter element mover 146 extends (as shown in FIG. 15) down and to the left from diverter element 144, around idler 184, through a tensioning device 185, back around idler 184, along conveyor 28 to idler 186, and then back to diverter element 144.

Tensioning device 185 may be a spring-loaded pulley mechanism, as shown. Tensioning device 185 acts to keep a sufficient tension on diverter element 144 via diverter element mover 146, in view of the various forces exerted by the articles, the conveyors, the motors, etc. Thus, tensioning device 185 provides for smoother operation, less slippage, etc.

Figure 14:
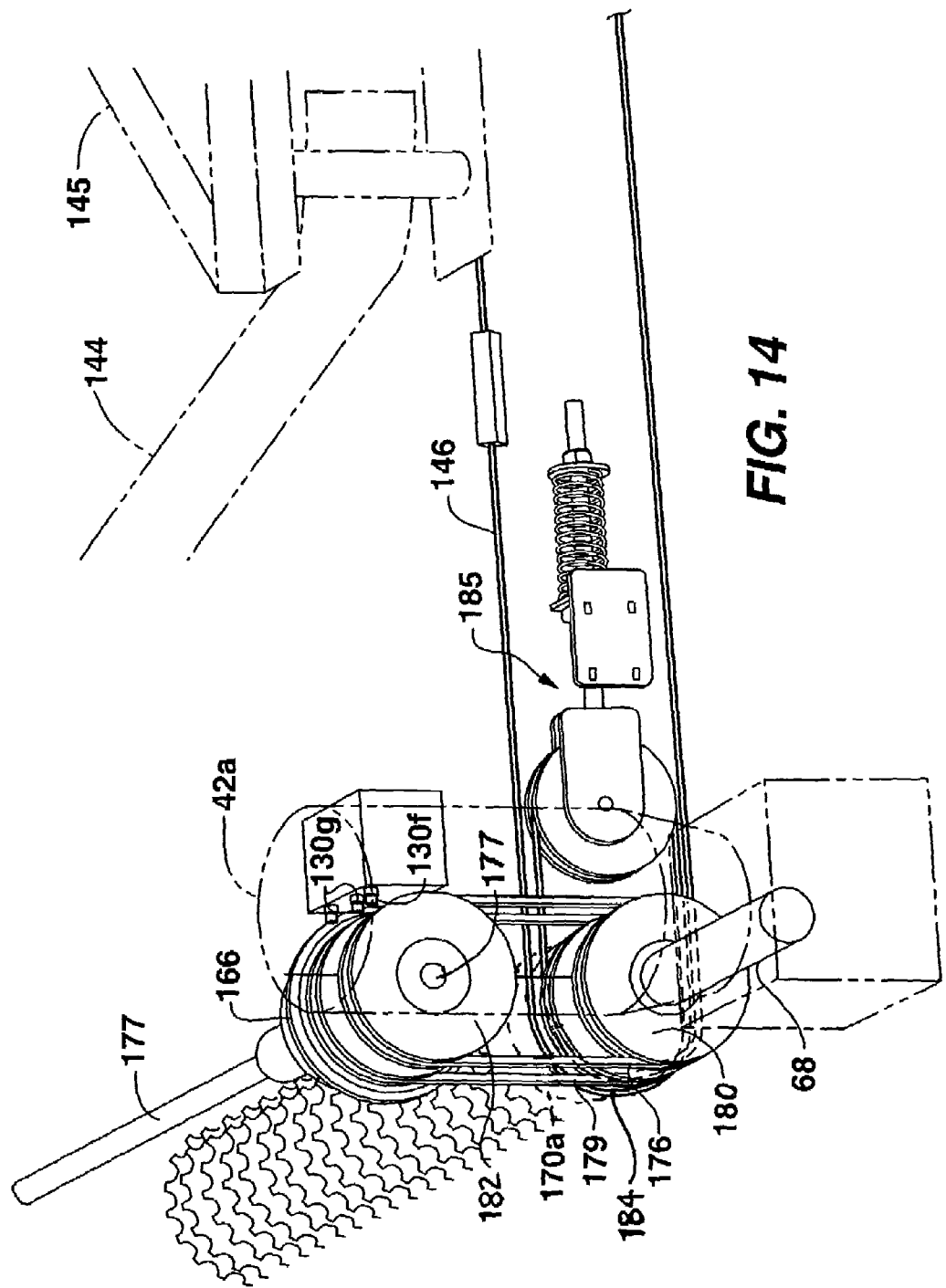
FIG. 14 is an enlarged schematic of a portion of the accumulator of FIG. 12.

As shown in FIG. 14, additional sensors may be located adjacent differential drive mechanism 166. For example, sensor 130f may comprise an overload switch for sensing overload on differential drive mechanism 166 by diverter element mover 146. Sensor 130f may comprise an optical sensor that senses movement of a portion of differential drive mechanism (not shown), triggered by an overload clutch that becomes operative when loading exceeds a certain predetermined amount. If the clutch is triggered, a signal can be sent to controller 134 to slow or stop operations of various portions of system 216. Sensors 130g may also be provided to sense a position of differential drive mechanism 166. Sensors 130g may detect rotating tabs or teeth (not shown) on differential drive mechanism housing to determine rotational position of the housing, to thereby calculate the position and direction and speed of movement of diverter element 144. This information can be fed to controller 134 in a feedback loop for additional precise control if desired.

Thus, the device disclosed in FIGS. 12–15 includes variations and additions to the previous devices with regard to elements such as sensors, controls, orientation and operation of a differential drive mechanism, etc. In certain applications, improved performance and reliability are afforded by some or all of the variations and additions.

Thus, the invention has been described with respect to various versions by way of example. Even so, those skilled in the art will appreciate that other versions are possible without materially departing from the novel teachings and advantages of the invention. For example, the carrier could ride on a rack and pinion arrangement, cable and drum arrangement, or a drag chain and rail arrangement. As another example, multiple intermediate drive mechanisms, including multiple differentials, could be distributed along the conveyor, especially for long belts. The belts could be radius, sideflexing belts arranged along a curved path. The differential could be realized with spur gears or other gear types. As the examples suggest, these and other modifications are intended to be included within the scope of the invention as defined in the following claims.

What is claimed is:

1. Apparatus for diverting a stream of articles, comprising:
    a first conveyor driven in a first direction and at a first speed around a first axle;
    a second conveyor driven in a second direction generally opposite of the first direction and at a second speed around a second axle;
    the first and second conveyors disposed generally parallel to each other;
    a diverter element extending at least partially across the first and second conveyors to divert articles conveyed on the first conveyor onto the second conveyor;
    a first transfer axle exterior to the first conveyor and rotated via the first axle;
    a second transfer axle exterior to the second conveyor and rotated via the second axle;
    a differential drive mechanism driven by the first and second transfer axles in a direction responsive to a relative rotation speed difference between the first and second transfer axles; and
    a diverter element mover operatively connected to the diverter element and the differential drive mechanism, the diverter element mover being driven by the differential drive mechanism to thereby move the diverter element in a path generally parallel to the first and second conveyors.

2. The apparatus as in claim 1, wherein the diverter element is disposed above the conveyors.

3. The apparatus as in claim 1, wherein the diverter element includes a separator for separating articles on the first conveyor from articles on the second conveyor.

4. The apparatus as in claim 1, further comprising a first drive mechanism for the first conveyor and a second drive mechanism for the second conveyor.

5. The apparatus as in claim 4, further comprising a controller configured with the first and second drive mechanisms and the differential drive.

6. The apparatus as in claim 5, wherein the controller controls the speed of the first and second drive mechanisms as a function of a supply of articles to the first conveyor and a demand for articles from the second conveyor.

7. The apparatus as in claim 1, further comprising a framework, the conveyors and the diverter element supported in the framework.

8. The apparatus as in claim 7, the framework being disposable adjacent a main conveyor such that articles conveyed on the main conveyor are diverted onto the first conveyor, and articles on the second conveyor are diverted back onto the main conveyor.

9. The apparatus as in claim 7, the framework being disposable adjacent an infeed conveyor and an outfeed conveyor such that articles conveyed on the infeed conveyor are diverted onto the first conveyor, and articles on the second conveyor are diverted onto the outfeed conveyor.

10. The apparatus as in claim 1, wherein the diverter element mover includes a cable driven via the differential drive mechanism.

11. The apparatus as in claim 10, further including a tensioning device for adjustably tensioning the cable.

12. The apparatus as in claim 11, wherein the tensioning device is a spring-loaded pulley.

13. The apparatus as in claim 1, wherein the first and second transfer axles are disposed above the first and second conveyors.

14. The apparatus as in claim 1, wherein the differential drive mechanism is disposed above the first and second conveyors.

15. The apparatus as in claim 1, wherein the differential drive mechanism includes two input gears and a differential gear.

16. The apparatus as in claim 1, further including a transfer driver operably connecting the first axle and the first transfer axle, whereby the first transfer axle is driven via the transfer driver.

17. The apparatus as in claim 16, wherein the transfer driver is an endless loop.

18. The apparatus as in claim 1, further including a transfer driver operably connecting the second axle and the second transfer axle, whereby the second transfer axle is driven via the transfer driver.

19. The apparatus as in claim 18, wherein the transfer driver is an endless loop.

20. The apparatus as in claim 1, further including a transfer driver operably connecting the differential drive mechanism and the diverter element, wherein the diverter element is driven via the transfer driver.

21. The apparatus as in claim 20, wherein the transfer driver is an endless loop disposed around the differential drive mechanism and an idler roller disposed around the first axle.

22. The apparatus as in claim 21, wherein the diverter element mover is disposed around and driven via the idler roller.

23. The apparatus as in claim 1, further including a sensing device for indicating a position of the diverter element.

24. The apparatus as in claim 23, wherein the sensing device is an optical sensor.

25. The apparatus as in claim 24, wherein the optical sensor senses a rotational position of a housing of the differential drive mechanism.

26. The apparatus as in claim 1, further including a controller and a plurality of sensors in communication with the controller, the controller controlling whether the first and second conveyors are driven, and if so, at what speed the first and second conveyors are driven, all based on signals received from the sensors.

27. The apparatus as in claim 26, wherein the sensors include two infeed sensors upstream from the first conveyor and three outfeed sensors downstream from the second conveyor.

28. The apparatus as in claim 27, wherein one of the infeed sensors generates a signal causing the controller to drive the first conveyor at a first speed, and a second of the infeed sensors generates a signal causing the controller to drive the first conveyor at a second speed.

29. The apparatus as in claim 28, wherein the second speed is higher than the first speed.

30. The apparatus as in claim 27, wherein one of the outfeed sensors generates a first signal causing the controller to drive the second conveyor at a first lower speed or a second signal causing the controller to drive the second conveyor at a second higher speed.

31. The apparatus as in claim 27, wherein two of the outfeed sensors are spaced from each other and both generate signals causing the controller to stop the second conveyor.

32. Apparatus for diverting a stream of articles, comprising:
a first conveyor driven in a first direction and at a first speed around a first axle;
a second conveyor driven in a second direction generally opposite of the first direction and at a second speed around a second axle;
the first and second conveyors disposed generally parallel to each other;
a diverter element extending at least partially across the first and second conveyors to divert articles conveyed on the first conveyor onto the second conveyor;
a differential drive mechanism operatively interconnected with and driven by the first and second axles in a direction responsive to a relative rotation speed difference between the first and second axles, the differential drive mechanism being located exterior to the first and second conveyors; and
an endless loop operatively connected to the diverter element and the differential drive mechanism, the endless loop being driven by the differential drive mechanism to thereby move the diverter element in a path generally parallel to the first and second conveyors.

33. The apparatus as in claim 32, wherein the endless loop is disposed on a side of one of the first or second conveyors opposite the other of the first or second conveyor.

34. The apparatus as in claim 33, wherein the diverter element includes an arm extending over the one of the first or second conveyors and a separator disposed at a distal end of the arm for separating articles on the first conveyor from articles on the second conveyor.

35. The apparatus as in claim 32, wherein the endless loop is disposed about an idler roller on one of the first or second axles, the idler roller being driven via the differential drive mechanism.

36. The apparatus as in claim 35, further including a drive belt disposed around the idler roller and the differential drive mechanism, the differential drive mechanism driving the idler roller via the drive belt, the idler roller driving the diverter element via the endless loop.

37. The apparatus as in claim 32, further including a tensioning device for adjustably tensioning the endless loop.

38. The apparatus as in claim 32, wherein the differential drive mechanism is disposed above the first and second conveyors.

39. The apparatus as in claim 32, further including first and second transfer axles operatively connected with the first and second axles respectively, the first and second transfer axles both connected to and providing input to the differential drive mechanism.

40. The apparatus as in claim 39, wherein the first and second transfer axles are driven by drive belts respectively driven by the first and second axles.

41. The apparatus as in claim 32, further including a sensing device for indicating a position of the diverter element.

42. The apparatus as in claim 41, wherein the sensing device is an optical sensor.

43. The apparatus as in claim 42, wherein the optical sensor senses a rotational position of a housing of the differential drive mechanism.

44. The apparatus as in claim 32, further including a controller and a plurality of sensors in communication with the controller, the controller controlling whether the first and second conveyors are driven, and if so, at what speed the first and second conveyors are driven, all based on signals received from the sensors.

45. The apparatus as in claim 44, wherein the sensors include two infeed sensors upstream from the first conveyor and three outfeed sensors downstream from the second conveyor.

46. The apparatus as in claim 45, wherein one of the infeed sensors generates a signal causing the controller to drive the first conveyor at a first speed, and a second of the infeed sensors generates a signal causing the controller to drive the first conveyor at a second speed.

47. The apparatus as in claim 46, wherein the second speed is higher than the first speed.

48. The apparatus as in claim 45, wherein one of the outfeed sensors generates a first signal causing the controller to drive the second conveyor at a first lower speed or a second signal causing the controller to drive the second conveyor at a second higher speed.

49. The apparatus as in claim 45, wherein two of the outfeed sensors are spaced from each other and both generate signals causing the controller to stop the second conveyor.

50. Apparatus for diverting a stream of articles, comprising:
   a first conveyor driven in a first direction and at a first speed;
   a second conveyor driven in a second direction generally opposite of the first direction and at a second speed;
   the first and second conveyors disposed generally parallel to each other;
   a diverter element extending at least partially across the first and second conveyors to divert articles conveyed on the first conveyor onto the second conveyor, the diverter element including a separator disposed between the first and second conveyors;
   a differential drive mechanism driven in a direction responsive to a relative rotation speed difference between the first and second conveyors; and
   a cable attached to the diverter element so as to form an endless loop and driven by the differential drive mechanism, the cable being laterally adjacent only one of the first or second conveyors, the diverter element including an arm having a first end attached to the cable and a second end attached to the separator, the diverter element including a central arm portion extending over the one of the first or second conveyors, the cable being driven by the differential drive mechanism to thereby move the diverter element in a path generally parallel to the first and second conveyors.

51. The apparatus as in claim 50, further including a tensioning device for adjustably tensioning the endless loop.

52. The apparatus as in claim 50, wherein the differential drive mechanism is disposed above the first and second conveyors.

53. The apparatus as in claim 50, further including a sensing device for indicating a position of the diverter element.

54. The apparatus as in claim 50, further including a controller and a plurality of sensors in communication with the controller, the controller controlling whether the first and second conveyors are driven, and if so, at what speed the first and second conveyors are driven, all based on signals received from the sensors.

55. The apparatus as in claim 54, wherein the sensors include two infeed sensors upstream from the first conveyor and three outfeed sensors downstream from the second conveyor.

56. The apparatus as in claim 55, wherein one of the infeed sensors generates a signal causing the controller to drive the first conveyor at a first speed, and a second of the infeed sensors generates a signal causing the controller to drive the first conveyor at a second speed.

57. The apparatus as in claim 56, wherein the second speed is higher than the first speed.

58. The apparatus as in claim 55, wherein one of the outfeed sensors generates a first signal causing the controller to drive the second conveyor at a first lower speed or a second signal causing the controller to drive the second conveyor at a second higher speed.

59. The apparatus as in claim 55, wherein two of the outfeed sensors are spaced from each other and both generate signals causing the controller to stop the second conveyor.

* * * * *